W. L. HOWARD.
VEHICLE WHEEL.
APPLICATION FILED JULY 16, 1910.
991,312.
Patented May 2, 1911.
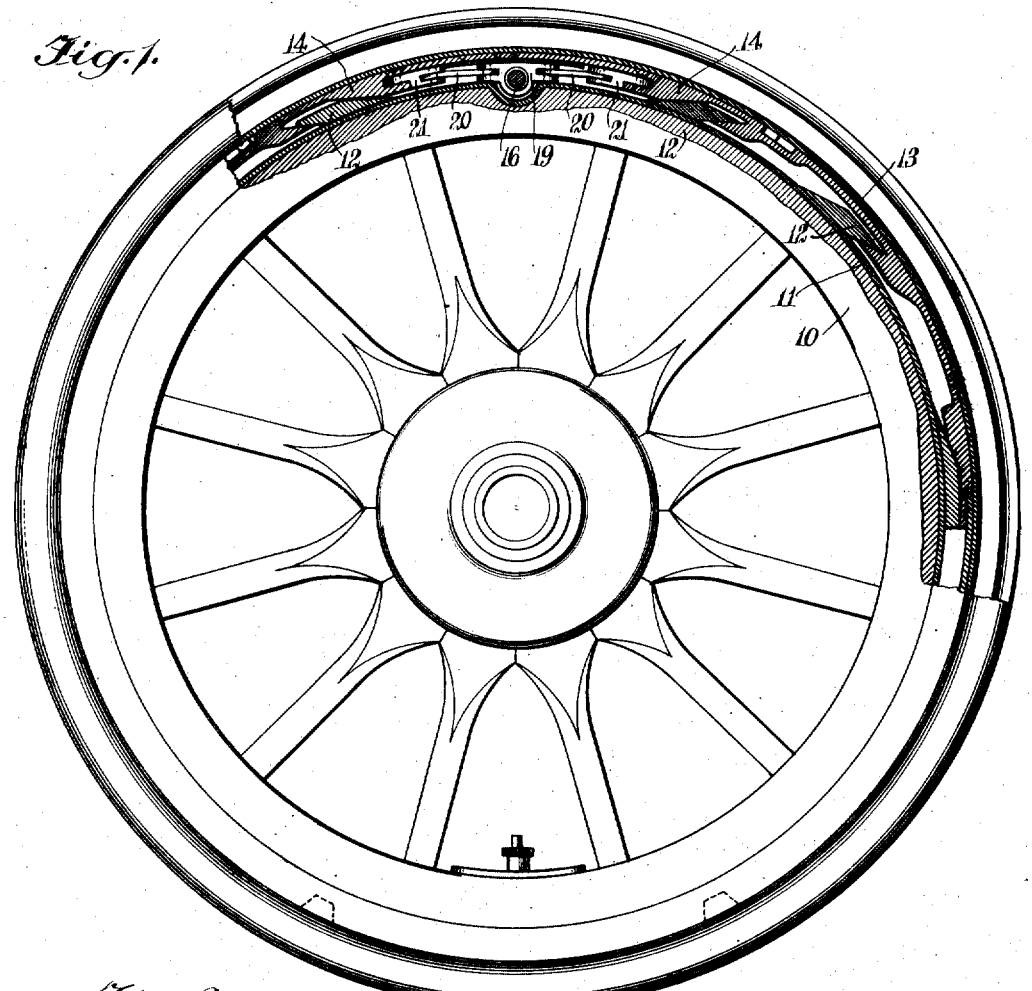
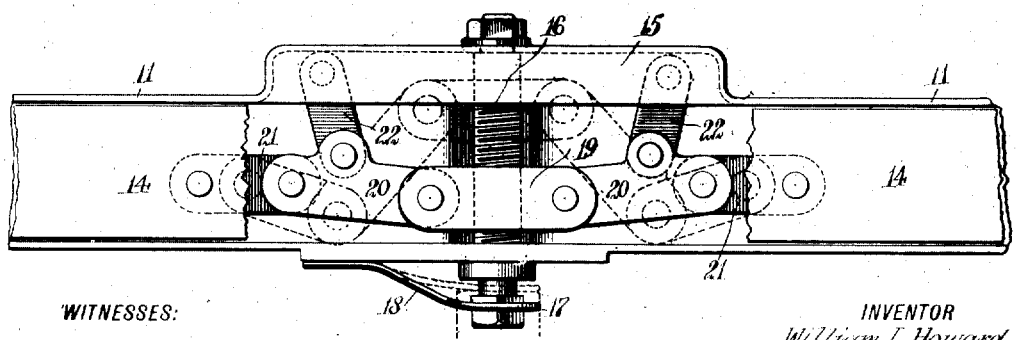
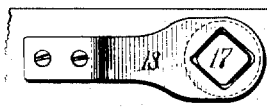
WITNESSES:
INVENTOR
William L. Howard
BY
ATTORNEYS

UNITED STATES PATENT OFFICE

WILLIAM L. HOWARD, OF TRENTON, NEW JERSEY.

VEHICLE-WHEEL.

991,312.

Specification of Letters Patent.

Patented May 2, 1911.

Application filed July 16, 1910. Serial No. 572,246.

*To all whom it may concern:*

Be it known that I, WILLIAM L. HOWARD, a citizen of the United States, and a resident of Trenton, in the county of Mercer and State of New Jersey, have invented a new and Improved Vehicle-Wheel, of which the following is a full, clear, and exact description.

My invention relates to certain improvements in vehicle wheels of that type in which the tire is carried by a removable rim, so that in case of a puncture or other injury to the tire, the injured tire and the rim may be readily removed and replaced by a new rim carrying a previously inflated tire.

More particularly, my invention relates to certain improvements in that type of construction shown in my previous Patent No. 932,862, issued August 31, 1909. In this type of construction I employ one or more gripping members which are movable circumferentially over cam surfaces, so that they will at the same time be forced outward radially to grip the inner surface of the rim and positively lock the latter in place.

My present invention involves an improved form of mechanism for operating these gripping members, and the object of the invention is to secure the rapid movement of the gripping members during the portion of their travel when they exert very little, if any, pressure, and to permit of a slow movement of said members during the portion of their travel when they are forced into their final or terminal gripping position. A rotary member is provided which may be turned in any suitable manner, and the speed of the gripping members varies in respect to the speed of the rotary member, as the latter is turned.

Reference is to be had to the accompanying drawings forming a part of this specification, in which similar characters of reference indicate corresponding parts in all the figures.

Figure 1 is a side view of a wheel, a portion thereof being broken away to show my improved mechanism; Fig. 2 is a plan view of the operating mechanism for the gripping members, the rim being removed; and Fig. 3 is a face view of the nut lock for normally preventing the turning of the rotary member.

My invention is adaptable for use in connection with any type of wheel in which there is a removable tire carrying rim secured in place by one or more circumferentially movable gripping members. In the accompanying drawings I have illustrated a wheel similar to that illustrated in my previous patent above referred to and in my previous patent No. 929,437, issued July 27, 1909. In this wheel a felly 10 of wood or other suitable material carries a channel-shaped peripheral member 11 upon the web of which there is mounted a series of cams 12. The rim 13, which is of any suitable construction, serves to hold the tire and engages with the channel member 11 along approximately one-half the circumference of the wheel. Within the channel member along the other half of the circumference are two gripping members 14, each presenting a curved outer surface adapted to engage with the inner surface of the rim, and each having upon its inner surface a series of cams adapted to engage with the cams 12 within the channel member 11. To this extent the construction does not involve any feature of my present invention.

My invention relates to the means for spreading the two gripping members 14 apart and for drawing them together, the preferred form of the said mechanism being clearly illustrated in Fig. 2. Adjacent the opposed ends of the gripping members 14—14 one side flange of the channel 11 is offset to form a recess or chamber 15, and midway between the ends of this recess or chamber a transversely extending rotatable screw 16 is supported. This screw is held against longitudinal movement by suitable nuts or flanges on the ends thereof, which engage with the side flanges of the channel. The screw at one end has a head 17 by means of which the screw may be rotated and adjacent this head there is preferably employed a nut lock 18 for normally preventing the rotation of the screw. This nut lock is formed of a piece of spring metal having one end rigidly secured to the side of the felly or adjacent part, and having the other end in the form of a yoke or pair of jaws for engagement with the head 17. Beneath the head is a groove, so that as a wrench or other tool is forced onto the head, the nut lock will be pressed inwardly to a point below the head, so that the latter may freely rotate. Upon the removal of the wrench or other tool, the nut lock will automatically spring out into engagement with the head of the screw to prevent the rotation of the latter.

Within the channel member 11 and between the ends of the gripping members 14 is a non-rotatable nut or collar 19 on the screw 16. The rotation of the screw causes this nut or collar to travel transversely from one side flange of the channel 11 to the opposite side flange. Pivotally secured to opposite sides of this nut or collar are links 20, and the outer end of each link 20 is connected to its corresponding gripping member by a pivoted link 21. Each link 20 is adapted to serve as a lever, and the fulcrum of the lever is a link 22 having one end pivotally secured to the link 20 intermediate of the ends of the latter and having the opposite end pivotally secured within the side recess or pocket 15.

In Fig. 2 the parts are illustrated in solid lines in the position which they occupy when the gripping members are forced apart to the limiting position, while the same parts are illustrated in dotted lines in the positions which they occupy when the gripping members are drawn toward each other to their limiting positions. It will be noted that when the gripping members are drawn toward each other, the links 20, which serve as levers, extend substantially crosswise of the channel. The turning of the screw 16 moves the collar or nut 19 transversely, and not only moves the links bodily, but also swings them on their movable fulcrums. Thus in spreading the gripping members 14 apart, a predetermined movement of the member 19 will cause a comparatively rapid outward movement of the gripping members, but as the movement of the member 19 continues, the links 20 approach positions in alinement with each other and in alinement with the links 21, so that the final portion of the movement of the member 19 gives an extremely small movement of the members 14. The member 16 may be rotated at uniform speed, and a uniform amount of power may be exerted. Very little resistance is offered to the spreading apart of the gripping members 14 when they begin their outward movement, but as the movement increases, the resistance increases and the rapidity of movement decreases at a rate directly proportional to the increase in resistance. Thus the links and levers constitute a form of toggle joint in which the greatest power will be applied at the time when the resistance is greatest, even though the screw 16 be rotated at uniform speed.

The form illustrated in the drawings constitutes only one embodiment of my invention, as it is evident that other mechanisms may be designed which operate to secure the desired results and which fall within the scope of my invention as defined in the appended claims.

Having thus described my invention, I claim as new and desire to secure by Letters Patent:

1. A vehicle wheel having a removable rim, two gripping members movable circumferentially and adapted to engage with the rim to retain the latter in position, a rotatable operating member, and toggle joint connections between said operating member and said gripping members.

2. A vehicle wheel having a removable rim, two gripping members movable circumferentially and adapted to engage with the rim to retain the latter in position, a rotatable operating member, and two levers each connecting the operating member to its corresponding gripping member, each having portions movable transversely of the rim.

3. A vehicle wheel having a removable rim, two gripping members movable circumferentially and adapted to engage with the rim to retain the latter in position, a rotatable operating member, and two levers each connecting the operating member to its corresponding gripping member and each having a movable fulcrum.

4. A vehicle wheel having a removable rim, two gripping members movable circumferentially and adapted to engage with the rim to retain the latter in position, a rotatable operating member, a non-rotatable nut mounted on said rotatable member, a pair of links pivotally connected with said nut, a second pair of links each pivotally connecting one of said first-mentioned links to its corresponding gripping member, and a pivotal support for each of said first-mentioned links intermediate of the ends of the latter.

5. A vehicle wheel having a felly, a removable rim, a circumferentially movable gripping member intermediate of said felly and said rim, a transversely disposed rotatable member adjacent to the end of the gripping member, and a toggle joint connection between said rotatable member and said gripping member.

6. A vehicle wheel having a felly, a removable rim, a circumferentially movable gripping member intermediate of said felly and said rim, a transversely disposed rotatable member adjacent to the end of the gripping member, a lever, connections between one end of said lever and said rotatable member, and connections between the other end of said lever and said gripping member.

7. A vehicle wheel having a felly, a removable rim, a circumferentially movable gripping member intermediate of said felly and said rim, a transversely disposed rotatable member adjacent to the end of the gripping member, a lever, connections between one end of said lever and said rotatable member, connections between the other end of said lever and said gripping member, and a movable fulcrum for said lever.

8. A vehicle wheel having a felly, a removable rim, a circumferentially movable gripping member intermediate said felly and said rim, a transversely disposed rotatable member adjacent to the end of the gripping member, a lever, connections between one end of said lever and said rotatable member, connections between the other end of said lever and said gripping member, and a link having one end thereof pivotally secured to said lever intermediate of the ends of the latter and having the opposite end secured to a fixed pivot.

9. A vehicle wheel having a removable rim, a circumferentially movable gripping member for retaining said rim in position, a transversely extending rotatable member, link connections between said rotatable member and said gripping member, a non-circular head on said rotatable member adapted to be engaged by a wrench or other tool, and a locking member in the form of a spring having one end thereof secured to said wheel and having the opposite end normally resiliently pressed into locking engagement with said head.

In testimony whereof I have signed my name to this specification in the presence of two subscribing witnesses.

WILLIAM L. HOWARD.

Witnesses:
CLAIR W. FAIRBANK,
JOHN P. DAVIS.

Copies of this patent may be obtained for five cents each, by addressing the "Commissioner of Patents, Washington, D. C."